(12) United States Patent
Cyna et al.

(10) Patent No.: US 11,972,482 B2
(45) Date of Patent: *Apr. 30, 2024

(54) SYSTEMS AND METHODS FOR PROVIDING LEVERAGED, TRADING-VOLATILITY-RESPONSIVE, INTRADAY BALANCING BASED ON PROJECTED PRICING

(71) Applicant: Bank of America Corporation, Charlotte, NC (US)

(72) Inventors: Raphael Thai-Binh Cyna, Astoria, NY (US); Jason Zahn, Jersey City, NJ (US); Runeet Kishore, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,010

(22) Filed: Oct. 15, 2021

(65) Prior Publication Data

US 2022/0036457 A1 Feb. 3, 2022

Related U.S. Application Data

(63) Continuation-in-part of application No. 16/927,008, filed on Jul. 13, 2020, now Pat. No. 11,386,497.

(60) Provisional application No. 62/878,400, filed on Jul. 25, 2019.

(51) Int. Cl.
*G06Q 40/04* (2012.01)
*G06Q 30/0201* (2023.01)

(52) U.S. Cl.
CPC ......... *G06Q 40/04* (2013.01); *G06Q 30/0206* (2013.01)

(58) Field of Classification Search
USPC ....................................................... 705/36 R
See application file for complete search history.

(56) References Cited

U.S. PATENT DOCUMENTS

| | | | |
|---|---|---|---|
| 2006/0036531 A1* | 2/2006 | Jackson | G06Q 20/042 |
| | | | 705/37 |
| 2013/0046673 A1* | 2/2013 | Kiron | G06Q 40/04 |
| | | | 705/37 |
| 2018/0276661 A1* | 9/2018 | van Wingerden | G06Q 20/383 |

* cited by examiner

*Primary Examiner* — Matthew S Gart
*Assistant Examiner* — Liz P Nguyen
(74) *Attorney, Agent, or Firm* — Weiss & Arons LLP

(57) ABSTRACT

The disclosure provides an intra-day/hourly balancing of a fund index. The disclosure includes retrieving the value of an underlying index at a first balancing point at a point in time that is close, in time, to the balancing point and determining the value of the underlying index at a second balancing point. If the value of the underlying index increased, then the method increases an exposure to the underlying index. If the value of the underlying index decreased, then the method decreases the exposure. The method may then compare the current trading volatility of the underlying index to a historic trading volatility. If the current volatility is greater than the historic volatility, then the method decreases the leverage of the intra-day index with respect to the underlying index. If the current volatility is less than the historic volatility, then the method increases the leverage.

7 Claims, 10 Drawing Sheets

SYSTEMS AND METHODS FOR PROVIDING LEVERAGED, TRADING-VOLATILITY-RESPONSIVE, INTRADAY BALANCING BASED ON PROJECTED PRICING

CROSS-REFERENCE TO RELATED APPLICATION

This application is continuation-in-part of co-pending, commonly-assigned, U.S. patent application Ser. No. 16/927,008, filed on Jul. 13, 2020, entitled, "SYSTEMS AND METHODS FOR PROVIDING LEVERAGED, TRADING-VOLATILITY-RESPONSIVE, INTRADAY BALANCING", which is a non-provisional application of U.S. Provisional Patent Application No. 62/878,400, filed on Jul. 25, 2019, entitled, "SYSTEMS AND METHODS FOR PROVIDING LEVERAGED, TRADING-VOLATILITY-RESPONSIVE, INTRADAY BALANCING".

FIELD OF TECHNOLOGY

Aspects of the disclosure relate to advancing technology related to trading of an index-based fund. Specifically, aspects of the disclosure relate to increasing balancing cadence for index-based funds.

BACKGROUND OF THE DISCLOSURE

It is typical for an index-based fund to trade based on a day's-end closing price. In fact, it is typical for all options-pricing models to be based on a day's-end closing price. One reason for this is that it is difficult, and at times impossible, to fix an inter-day pricing or balancing value simultaneous to trading occurring on the instrument underlying the options, or index.

In fact, the hardware associated with index-based funds is specified for retrieving day's-end closing price. Such hardware is typically insufficient for supporting any trading that requires price retrieval at intervals that occur more than once daily.

In addition, index funds typically provide hedging vehicles—for hedging against other market positions held by a trader. One problem associated with using an index fund to hedge is that the index fund can be very volatile. As such, the benefits of the hedging using the index fund may be offset by the risk associated with the volatility of the index fund itself. As such it would be desirable to provide software/hardware that is capable of using more frequent data retrievals while reducing exposure to risk associated with index funds.

It also be desirable to repurpose software/hardware that is available—e.g., in use for other types of contracts—and integrate such software/hardware for use in providing an inter-day index fund.

It would be even more desirable to include artificial intelligence in hedging system that served to maintain access to positive returns associated with an index fund while keeping risk to a level typically associated with hedging activities.

SUMMARY OF THE DISCLOSURE

One or more computer-readable media storing computer-executable instructions which, when executed by a processor on a computer system, perform method(s) for providing an intra-day balancing of an intra-day index, are provided. A method according to certain embodiments may include determining a value of an underlying index at a first, pre-determined, intra-day, balancing point. The determining may include retrieving the value from a trading tape at a point in time that is fixed with respect to the balancing point. The method may then determine the value of the underlying index at a second, later-in-time, pre-determined, intra-day, balancing point. The determining at the second balancing point may include retrieving the value from the trading tape at a point in time that is fixed with respect to the second balancing point.

If the value of the underlying index increased between the first balancing point and the second balancing point, then the method may include proportionally, incrementally and/or otherwise, increasing, by preferably no more than a pre-determined percentage cap, an exposure of the intra-day index to the underlying index. The pre-determined percentage cap acts a constraint on the point-to-point adjustment of the intra-day index.

If the value of the underlying index decreased between the first balancing point and the second balancing point, the method may include proportionally, incrementally and/or otherwise, decreasing, by preferably no more than a pre-determined percentage floor, the exposure to the underlying index.

Certain embodiments of the invention may include comparing the current trading volatility of the underlying index to a historic trading volatility of the underlying index. If the current trading volatility is greater than the historic trading volatility, then the methods may include decreasing the leverage ("deleverage") of the intra-day index with respect to the underlying index. If the current trading volatility is less than the historic trading volatility, then the methods may include increasing the leverage ("lever") of the intra-day index with respect to the underlying index.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
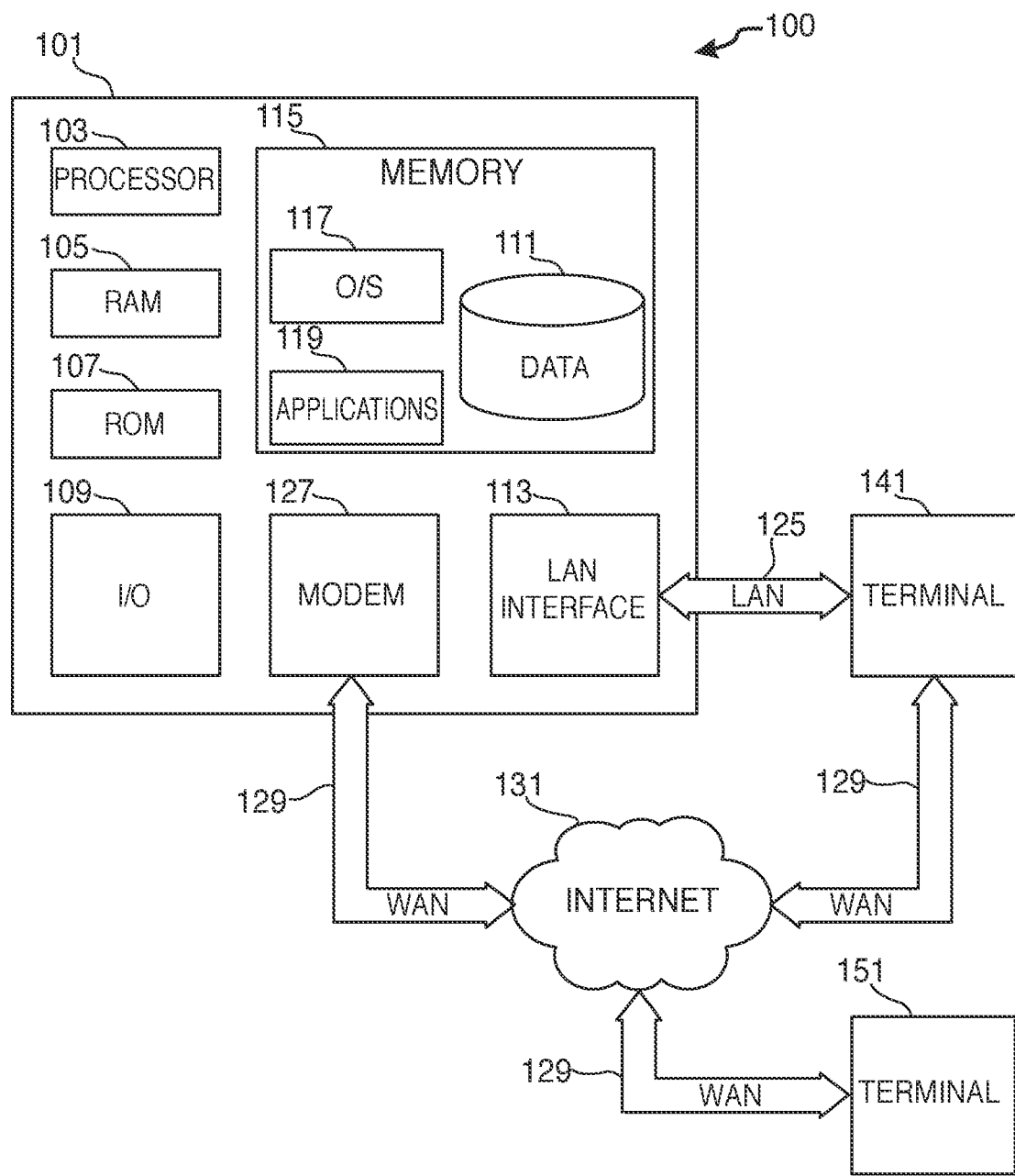
FIG. 1 shows an illustrative system in accordance with principles of the disclosure.

Systems and methods for providing intraday balancing of an index are provided. Some methods may include determining a value of an underlying index at a first, pre-determined, intra-day, balancing point. The determining may include retrieving the value of the underlying index from a trading tape. The retrieving preferably occurs at a point in time that is fixed with respect to the balancing point. It should be noted that, in certain embodiments, the retrieving may include retrieving at a point-in-time that is closest to the balancing point.

Certain embodiments may also include determining the value of the underlying index at a second, later-in-time, pre-determined, intra-day, balancing point. The determining at the second balancing point may include retrieving the value from the trading tape at a point in time that is fixed, or alternatively is as close as possible to, the second balancing point.

In some of the embodiments, if value of the underlying index increased between the first balancing point and the second balancing point, then the methods may include proportionally increasing, by no more than a pre-determined percentage cap, an exposure of the intra-day index to a value of the underlying index. In some embodiments, the increasing may occur at a non-proportional variance. In such embodiments, the increasing may be only partially proportional—e.g., such as a varying increments, but not at a direct proportionality.

If the value of the underlying index decreased between the first balancing point and the second balancing point, then the methods may include proportionally decreasing, by no more than the pre-determined percentage floor, the exposure to a value of the underlying index.

In some embodiments, the pre-determined cap is the same as the pre-determined floor. In some embodiments, the pre-determined cap is different from the pre-determined floor.

In certain embodiments, methods may include comparing the current trading volatility of the underlying index to a historic trading volatility of the underlying index. If the current trading volatility is greater than the historic trading volatility, then the methods may decrease the leverage ("deleverage") of the intra-day index with respect to the underlying index. If the current trading volatility is less than the historic trading volatility, then the methods may include increasing the leverage ("lever") of the intra-day index with respect to the underlying index.

In certain embodiments, the retrieving the value from the trading tape at a point in time may include retrieving the value from a real-time flow of executed electronic trades relating to the underlying index.

If the current trading volatility is greater than the historic trading volatility, the deleverage of the intra-day index with respect to the underlying index further may include a logarithmic deleverage.

If the current trading volatility is less than the historic trading volatility, the increase of the leverage of the intra-day index with respect to the underlying index may include a logarithmic increase in the leverage.

The method may also include reducing, by a return associated with a pre-determined risk-free investment, a calculated return of the intra-day index.

In certain embodiments, an index according to the invention, based on an underlying index or other underlying equity, contract or other trading item, whether domestic or international, may rebalance (and repricing) intraday, can preferably occur on every trading day. The rebalancing may occur at any suitable time during the trading day. For example, the rebalancing may occur at 10 am, 11 am, 12 am, 1 pm, 2 pm, 3 pm and/or 4 pm Eastern Standard Time. The rebalancing may occur at any suitable time during the trading day.

In certain embodiments, the rebalancing may be computed at a given time. For example, at a given time h, the rebalancing may be computed, in the exemplary equations, as follows:

$$FC\ Index_h = FC\ Index_{h-1} \times$$

$$\left[1 + Participation_{h-1} \times \left(\frac{RiskyAsset_h}{RiskyAsset_{h-1}} - 1 - Libor\ 3m_{h-1} \times \Delta_{h-1,h}\right)\right]$$

where:

$$Risky\ Asset_h = RiskyAsset_{h-1} \times \frac{[XNDX_h]}{[XNDX_{h-1}]}$$

$$Participation_{h-1} = Max(Participation_{h-2} - Cap,$$

$$Min(Target\ Participation_{h-1}, Participation_{h-2} + Cap))$$

$$Target\ Participation_{h-1} = Min\left(Max\ Leverage, \frac{FC\ Level}{Realized\ Vol_{h-2}}\right)$$

$$Realized\ Vol_h = Max(Realized\ Vol_{1,h}, Realized\ Vol_{2,h})$$

Realized $Vol_{1,h}$ is the Risky Asset realized vol on a $3bd$ window($3 \times 7 = 21$ hourly data points):

$$Realized\ Vol_{1,h} = \sqrt{252 \times 7 \times \frac{1}{21} \times \sum_{i=h-20}^{h} \ln\left(\frac{RiskyAsset_i}{RiskyAsset_{i-1}}\right)^2}$$

Realized $Vol_{2,h}$ is the Risky Asset realized vol on a $5bd$ window ($5 \times 7 = 35$ hourly data points):

$$Realized\ Vol_{2,h} = \sqrt{252 \times 7 \times \frac{1}{35} \times \sum_{i=h-34}^{h} \ln\left(\frac{RiskyAsset_i}{RiskyAsset_{i-1}}\right)^2}$$

$$\Delta_{h-1,h} = Day\ count\ Fraction\left(\frac{act}{360}\right) Cap = [15\%]$$

It should be noted that the term, "Libor $3m_{h-1} \times \Delta_{h-1,h}$," is preferably inserted to remove the substantially "risk-free" profit from the calculation. As such, the embodiments present solutions for deriving values that preferably zero out—i.e., reduces to nil by discounting—any amount of profit derived from the formulas that may be realized, without risk, from a "risk-free" investment such as the Libor rate (the average interbank interest rate at which a selection of banks on the London money market are prepared to lend to one another)(hereinafter, the "Libor"). While the term set forth herein utilizes the Libor rate to provide the risk-free investment, it should be noted that any term that is referred to in the art as a "risk-free" or substantially "risk-free" investment could be substituted for the Libor Rate set forth herein.

In the particular example set forth above, the intra-day index at h is being priced. The price for the intra-day index at h depends, at least in part, on the price of the intra-day index at h-1. Participation at h-1, as shown in the equation below, equals.

The Risky Asset, as used in the intra-day index equation, and Participation are defined in an exemplary fashion in the following equations:

$$\text{Risky Asset}_h = \text{RiskyAsset}_{h-1} \times \frac{[XNDX_h]}{[XNDX_{h-1}]}$$

$$\text{Participation}_{h-1} = \text{Max}(\text{Participation}_{h-2} - \text{Cap}, \text{Min}$$
$$(\text{Target Participation}_{h-1}, \text{Participation}_{h-2} + \text{Cap}))$$

$$\text{Target Participation}_{h-1} = \text{Min}\left(\text{Max Leverage}, \frac{FC\ \text{Level}}{\text{Realized}\ Vol_{h-2}}\right)$$

In certain embodiments, participation can be understood to mean leverage—i.e., exposure to the underlying index. In the embodiments set forth herein, participation is understood to refer to leverage with a double caveat. The double caveat of the leverage is that the leverage is limited by a maximum deviation from the previous participation level. This maximum deviation may preferably be as expressed a cap/floor deviation (in the exemplary equation set forth herein—the maximum deviation (cap) was set to 15.0% (which also acts as a floor), as will be explained in more detail with reference to the equations set forth above.

With reference to the equations above—the term "Risky Asset" may be understood to refer to an index such as the NASDAQ. In the equation "FC Index$_h$=" it is shown that the participation acts a multiplier of the Risky Asset term. For example, in the exemplary equations above—if Participation$_{h-1}$ equals 2, this indicates that the intra-day index value over the immediately past period—e.g., from 10 AM-11 AM, when the intra-day index is being calculated at 11 AM—is twice the value of the underlying index. As such, if the NASDAQ rose 2.0% over the immediately past period, then the intra-day index rose 4.0%. If the NASDAQ rose 0.5% over the immediately past period, then the intra-day index rose 1.0%. If the NASDAQ dropped 0.5% over the immediately past period, then the intra-day index dropped 1.0%.

For the reasons that follow, the Participation$_{h-1}$ term preferably serves to increase the exposure to the leverage of the associated Risky Asset as the value of the asset rises, and serves to decrease the exposure to the leverage of the associated Risky Asset as the value of the asset decreases. This process, referred to herein as levering and de-levering the index, preferably provides advantages in addition to providing intraday updated balancing of the index.

One additional aspect of the Participation$_{h-1}$ is the maximum deviation referred to above. In the exemplary embodiment set forth herein, Participation$_{h-1}$ represents the determination of the exposure to the index for re-balancing at, for example, 12 PM. The Target Participation represents the leverage amount that the index would like to be at in the next balancing. However, if the difference between the Participation$_{h-1}$ and the Target Participation$_{h-1}$ is greater than the cap—then the index, in this embodiment, allows the next balancing to include on the Participation$_{h-1}$ adjusted by the cap amount in the direction of the Target Participation$_{h-1}$.

In one exemplary embodiment, the Target Participation$_{h-1}$ may be formed according to the following equations:

$$\text{Target Participation}_{h-1} = \text{Min}\left(\text{Max Leverage}, \frac{FC\ \text{Level}}{\text{Realized}\ Vol_{h-2}}\right)$$

In such an embodiment, the following given values may be used:

FC Level=[12.5%]

Max Leverage=[175%] However, it should be noted that the disclosure is not limited to the particular values set forth above, or with regards to any of the particular values set forth herein, and it is within the scope of the disclosure to have given values that are either higher or lower than all of the values provided herein.

With respect to the equation above for Target Participation$_{h-1}$, it should be noted that the minimum of the max leverage (in the example set forth herein, 175%) and $$\frac{FC\ \text{Level}}{\text{Realized}\ Vol_{h-2}}$$

may preferably be used as the Target Participation$_{h-1}$ in determining the Participation$_{h-1}$ determination of the exposure to the index for re-balancing. It should be further noted that the preferably only non-fixed term in the Target Participation$_{h-1}$ equation relates to the previously determined volatility at a point in time that was prior by two balancing cycles. Accordingly, the Target Participation$_{h-1}$ will vary, at least in some circumstances, with the variance of the volatility of the index with which the index is exposed. In the equation shown above, it is yet further noted that the Target Participation$_{h-1}$ will vary, at least in some circumstances, inversely proportionally to the variance of the volatility of the index with which the index is exposed.

Exemplary equations for calculating the value of the Realized Vol$_h$ are set forth below. The equations below compares the volatility of the underlying index from three days prior, and from five days prior to obtain the maximum value for Realized Vol$_h$. It should be noted, however, that any suitable historical volatility calculation may be implemented in order to capture the historic volatility snapshot of the underlying index term.

$$\text{Realized}\ Vol_h = \text{Max}(\text{Realized}\ Vol_{1,h}, \text{Realized}\ Vol_{2,h})$$

Realized $Vol_{1,h}$ is the Risky Asset realized $vol$ on a $3bd$ window($3 \times 7 = 21$ hourly data points):

$$\text{Realized}\ Vol_{1,h} = \sqrt{252 \times 7 \times \frac{1}{21} \times \sum_{i=h-20}^{h} \ln\left(\frac{RiskyAsset_i}{RiskyAsset_{i-1}}\right)^2}$$

Realized $Vol_{2,h}$ is the Risky Asset realized $vol$ on a $5bd$ window($5 \times 7 = 35$ hourly data points):

$$\text{Realized}\ Vol_{2,h} = \sqrt{252 \times 7 \times \frac{1}{35} \times \sum_{i=h-34}^{h} \ln\left(\frac{RiskyAsset_i}{RiskyAsset_{i-1}}\right)^2}$$

It should be noted, with respect to the equations set forth herein, that there is a one period lag to the calculation. Accordingly, the calculations for the balancing at 12:00 PM will provide a value for distribution at 1:00 PM and so forth with other suitable balancing. This one, or more, period lag enables the system to provide inter-day balanced values without having to provide instantaneous, fixed, prices for a currently balanced indexed. Accordingly, the disclosure has, in a certain sense, compressed days into hours to enable the system to provide more balancing points throughout the trading day. The disclosure has done this at the same time as providing a system and method that levers and de-levers with respect to the underlying index, and also keyed the product into an inverse of the trading volatility of the index or some other suitable equity or contract.

In some embodiments, Realized Vol$_{1,h}$ and Realized Vol$_{2,h}$ may be computed using an Equally Weighted Moving Average (EWMA) smoothing method. EWMA smoothing methods infer volatility in a way that takes into account the entire history of price changes observed over regular intervals, with more recent observations driving the inference more prominently than the less recent observations.

In some embodiments, the holdings of Risky Asset may be divided into N sub-units, which each sub-unit of holdings traded over each of N fixed intervals respectively throughout the trading day. Each of the N fixed intervals will have corresponding Realized $Vol_{1,n,h}$ and Realized $Vol_{2,n,h}$, $n \in [1 \ldots N]$.

In some embodiments, the probability of Risky Asset falling above or below a predetermined level will be computed at fixed intervals throughout the day using realized longer-term volatility of risky asset, Realized $Vol_{h,LT}$ as one of the inputs. One example of a methodology to compute longer term realized volatility can be as shown below.

$$\text{Realized } Vol_{h,LT} = \sqrt{252 \times 21 \times \frac{1}{147} \times \sum_{i=h-146}^{h} \ln\left(\frac{RiskyAsset_i}{RiskyAsset_{i-1}}\right)^2}$$

Alternative methodologies like Exponentially Weighted Moving Average (EWMA) volatility calculation, or other broadly quoted measures of Risky Asset volatility on market data feeds and interfaces like Bloomberg could also be used to compute longer term realized volatility.

In some embodiments, the index may take long (or, alternatively, short) position in the Risky Asset proportion to probability of the price of Risky Asset falling below (or, alternatively, rising above) a predetermined level.

Pseudocode that represents, schematically, at least a portion of the foregoing equations is set forth below.

Model implementation (pseudo code in proprietary language Bucephalus)

```
$eps=0.0000000001;
$Sfactor=S[0,0:n]/Fwd[0,0:n];
$Sret=Sfactor[1:n]/Sfactor[0:n-1]-1;
$Su=CumProd(1 & max(1+betau*Sret, eps))*fwd[0,0:n];
$Sd=CumProd(1 & max(1+betad*Sret, eps))*fwd[0,0:n];
$nsub=len(SubIndex0);
$niter=round(n/nsub);
$subInd0=subIndex0[mod(iSubIndex+(0:nsub-1),nsub)];
$ifc=nsub;
$U0=avg(subIndex*min(S[ifc]/S[0:ifc-1],1+Cap)/
subInd0);
$SubInd=subIndex;
$tmp=list($i, 0:niter, $SubInd=SubInd*(Su[min(n,ifc:ifc+
nsub-1)]/Su[min(n,ifc-nsub:ifc-1)]-plus(Sd[min(n,ifc:ifc+
nsub-1)]/Sd[min(n,ifc-nsub:ifc-1)]-1-Cap));
$ifc=ifc+nsub; ifc);
$U=avg(subInd/subInd0);
plus(U/U0-Strike)*df[n]
```

Such systems and methods as set forth herein preferably require relatively high levels of liquidity of the underlying index. The reason for this is because there needs to be sufficiently fast electronic systems which can provide enough information to run a system that is balancing multiple times daily.

Moreover, the trading machines and software for enabling such intraday fixing as set forth in the disclosure should be sufficiently fast and robust as to retrieve live information from the trading tape—off of an electronic flow of real-time trade orders and/or preferably trade executions. The speed and robustness is typically not found in hardware/software currently being used for trading options on index funds, which typically price based on close-to-close information as opposed to inter-day balancing and trading.

In some embodiments, the information for the price of the underlying information can be retrieved from the trading tape within a predetermined time of the fixing point. As such, the information may be retrieved from the trading tape at the first trade after the fixing point, at the nearest trade to the fixing point, at the last trade prior to the fixing point or at any other suitable proximity to the fixing point.

It should be noted that the information from the trading tape is typically used to retrieve information to price the index for the next balancing and fixing.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Computer 101 may be a computer capable of retrieving real-time information from a trading tape, or other suitable flow of electronic information, and using that information to calculate the intra-day index values set forth herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache
memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to recognizing, labeling, indexing, disaggregating, and/or depositing files.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement services provided by the system, and/or any other suitable tasks.

The invention may be operational with numerous other general purpose or special purpose computing system environments or configurations. Examples of well known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network.

In a distributed computing environment, program modules may be located in both local and remote computer storage media including memory storage devices.

Figure 2:
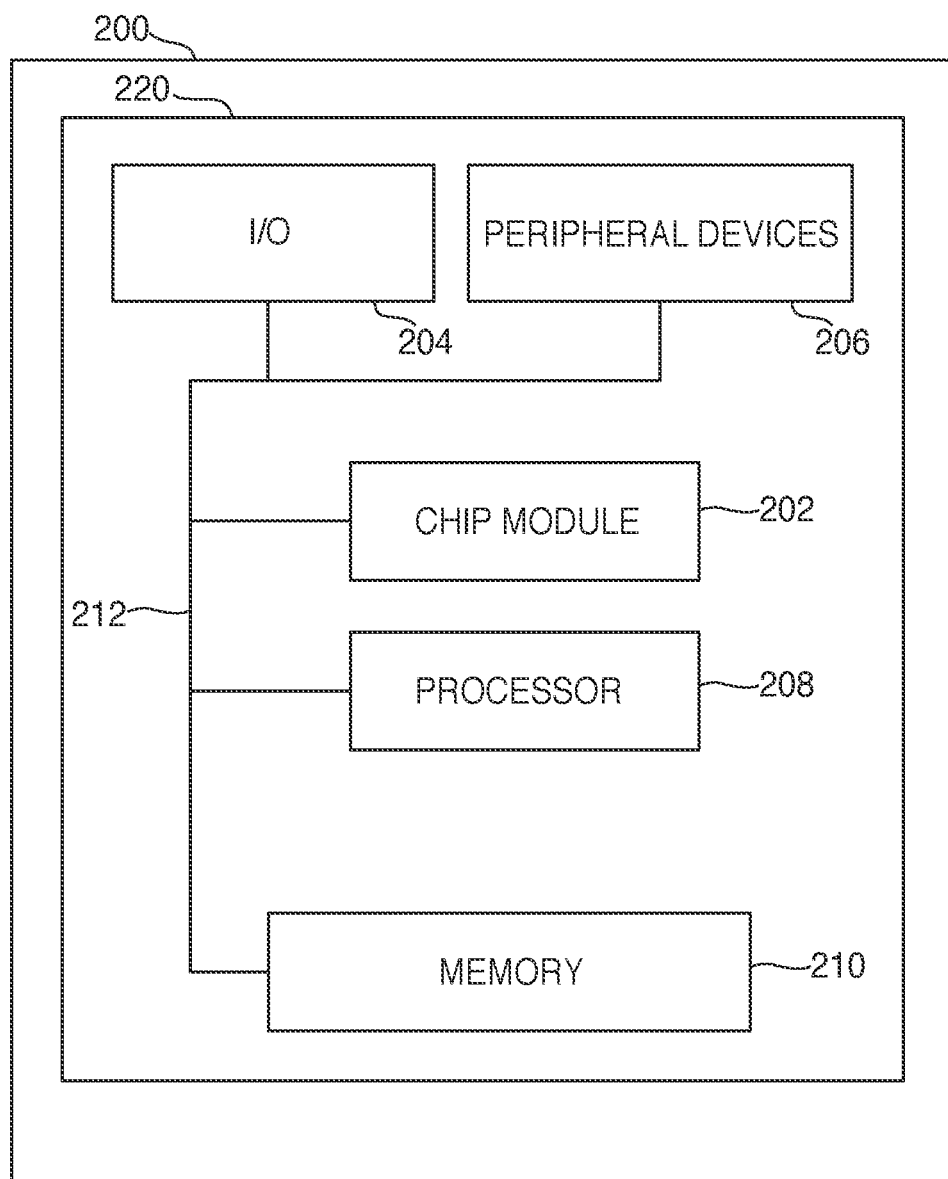
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
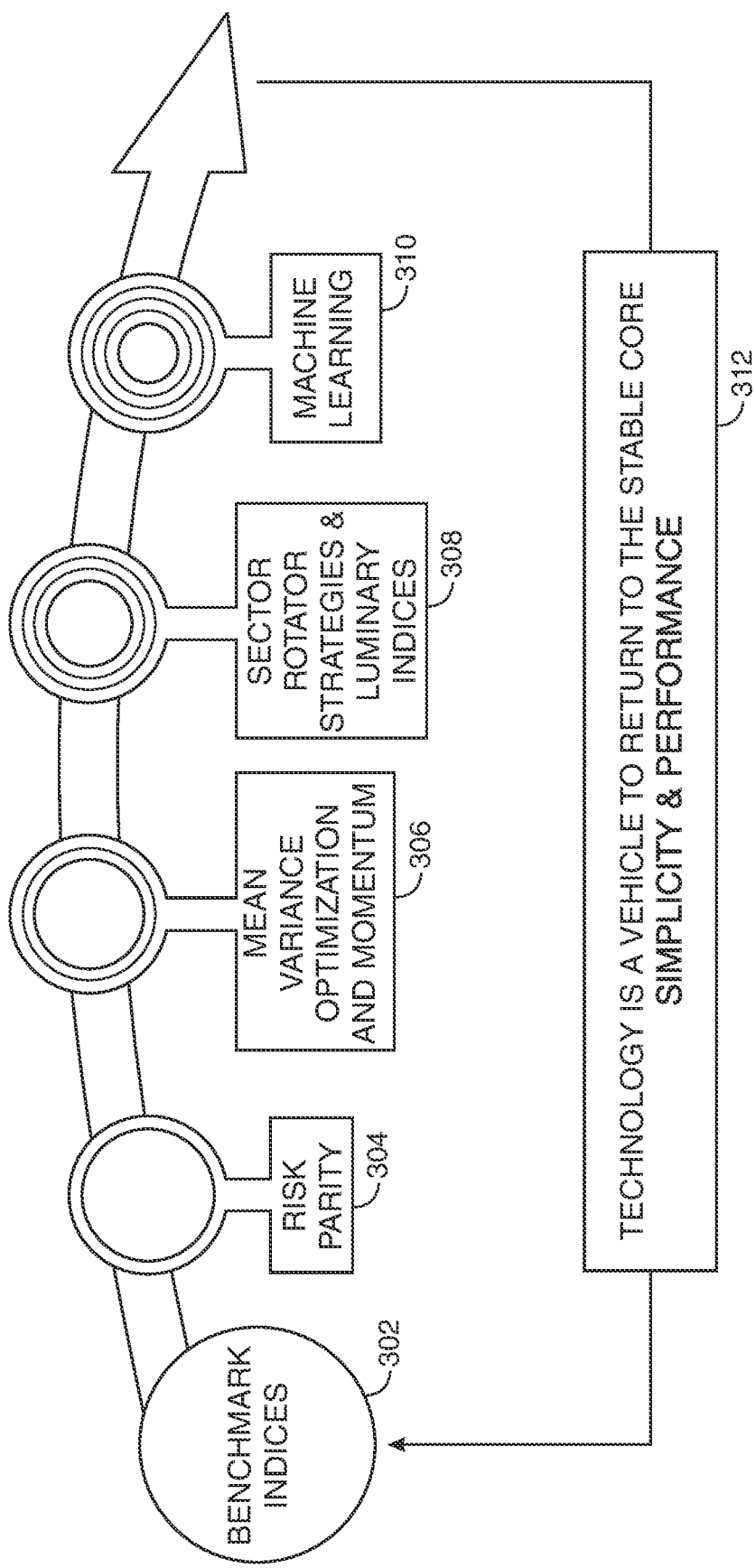
FIG. 3 shows a schematic diagram of the technological/theoretical framework according to certain embodiments.

FIG. 3 shows a schematic diagram of the technological/theoretical framework according to certain embodiments. Step 302 shows that the systems and methods set forth herein rely on one or more underlying benchmark indices. At 304, the diagram shows that the goals of the framework include creating risk parity by reducing the risk associated with using a benchmark index as a hedging vehicle.

Mean variance optimization and momentum, at 306, are also included in the framework. The purpose of the mean variance optimization and momentum at 306 is to indicate that systems and methods according to embodiments preferably enable investors to take on lower risk while still exposing their investments to the possibility of a higher return. The momentum term in 306 preferably indicates that systems and methods according to the invention also enable an investor to participate in the benefits of "momentum" trading, which exploits the building of trading in the direction of the market, while minimizing the exposure of the investment to extreme market fluctuations.

Step 308 shows that systems and methods according to the invention also enable an investor to participate in sector rotator strategies—i.e., strategies that moves investments from one area of investment to another—and luminary indicies without exposure to unchecked market behavior.

Finally—machine learning at 310 preferably enables the systems and methods to continue to develop and further refine the principles set forth herein. Such refinement allows for continuing protection from market spike behavior while providing for exposure to successful investments. It should be noted that machine learning 310 may preferably continually allow the system to adhere to its basic principles of leveraging and deleveraging with respect to decreases in volatility and increases in volatility, respectively, and adding exposure in increasing markets and reducing exposure in decreasing markets, while adjusting for evolving market conditions. One example of such an evolving market condition may include a condition whereby a decrease in trading volatility produces a less or more powerful effect on volatility than was previously recorded. In such instances, the AI associated with the system may change the FC Level or the Max Leverage set in the equations listed above.

The entire theme of the disclosure is reiterated at 312, which states, in pertinent part, that the technology disclosed herein represents a return to the stable core of performance investing.

Figure 4:
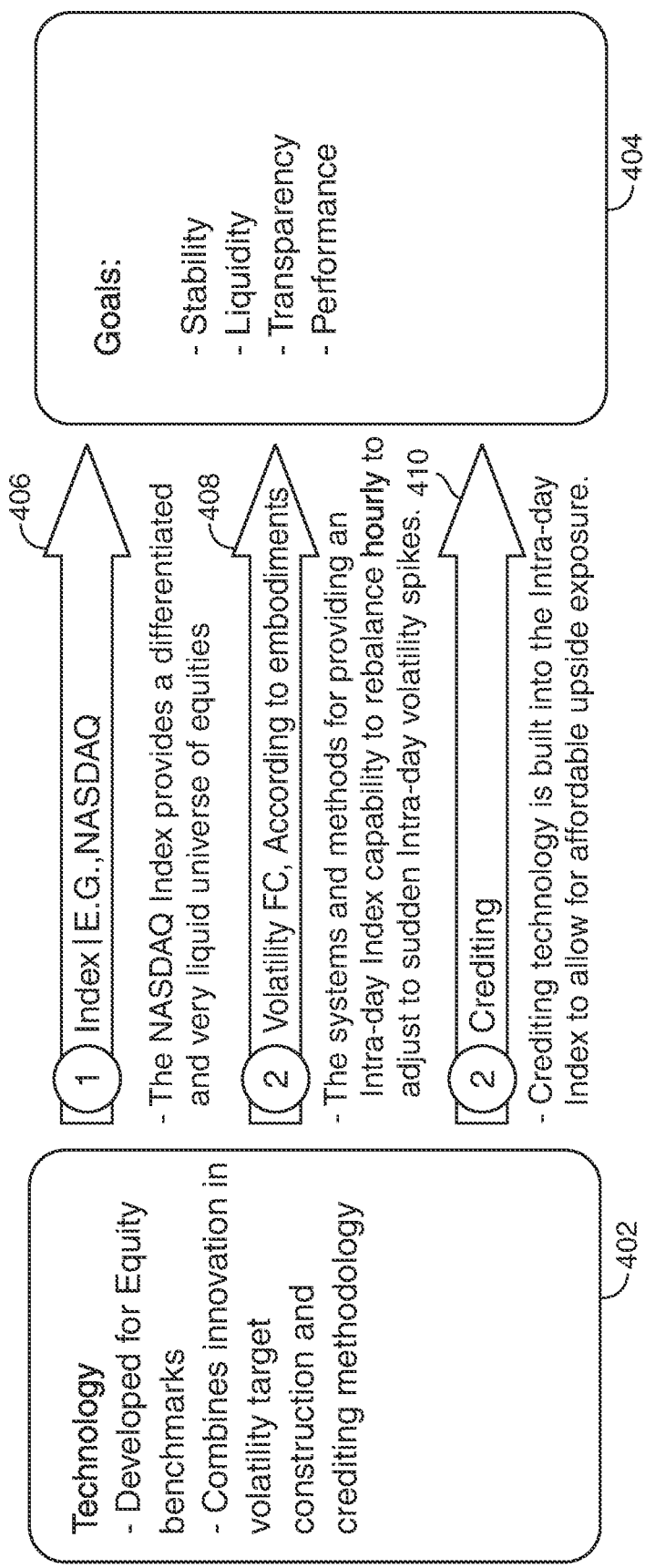
FIG. 4 shows a schematic diagram of the building blocks of the technology of the disclosure.

FIG. 4 shows a schematic diagram of the building blocks of the technology of the disclosure. At 402, that the technology disclosed in the embodiments is developed for equity benchmarks. Furthermore, the technology combines innovation in volatility target construction and crediting methodology to preferably enable achievement of goals according to the invention.

One particular aspect of the innovation relates to bootstrapping technology used for other types of derivative contracts—i.e., technology used for retrieving real-time trade execution information from an electronic flow of such real-time trade execution information—to provide the information necessary for the intra-day balancing of an intra-day index according to the embodiments set forth herein. It should be noted that goals for the index, as set forth at 404, are stability, liquidity, transparency and performance.

One example of an underlying index used to provide a baseline instrument for the calculation of the intra-day index is the NASDAQ index shown at 406. The NASDAQ index is—The NASDAQ Index provides a differentiated and sufficiently liquid universe of equities.

At 408, the systems and methods used for determining the intra-day index preferably provide the capability to rebalance hourly in order to adjust to sudden intraday volatility spikes.

At 410, it is noted that crediting technology is preferably built into the Index to allow for affordable upside exposure.

Figure 5:
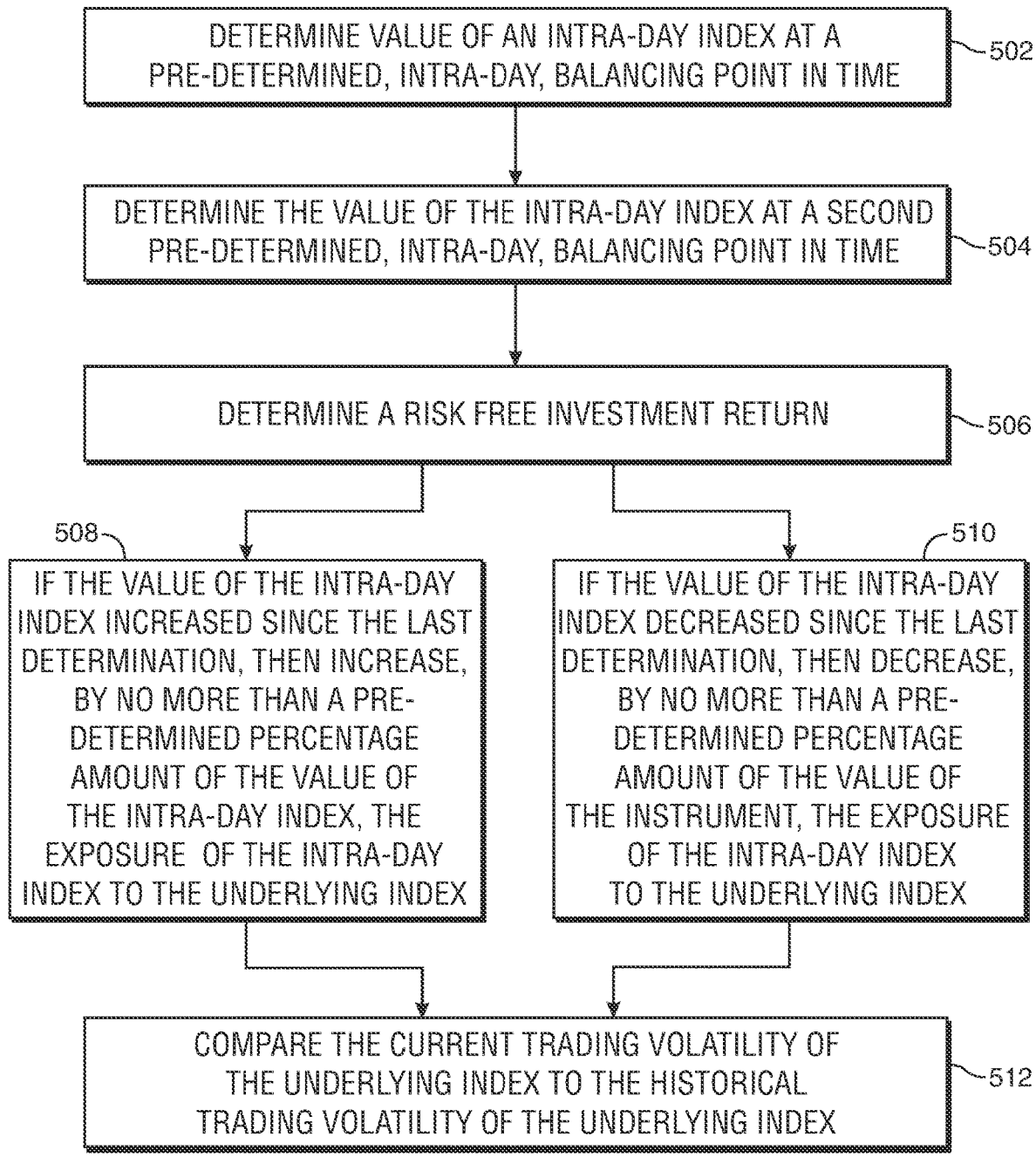
FIG. 5 shows an illustrative flow diagram of core principles according to certain embodiments.

FIG. 5 shows an illustrative flow diagram of core principles according to certain embodiments. Step 502 shows determining value of an intra-day index at a pre-determined, intra-day, balancing point in time.

Step 504 shows determine the value of the intra-day index at a second pre-determined, intra-day, balancing point in time. Step 506 shows determining a risk free investment return. It should be noted that step 506 may not be required in all embodiments of the invention.

Step 508 shows that the system make a determination whether the value of the intra-day index increased since the last determination. If the value since the last determination increases then the diagram shows increasing, by preferably no more than a predetermined percentage amount of the value of the intra-day index or other suitable limiting metric, the exposure of the intra-day index to the underlying index.

Step 510 shows that if the value of the underlying index decreases since the last determination decreases then the diagram shows decreasing, by preferably no more than a predetermined percentage amount of the value of the intra-day index or other suitable limiting metric, the exposure of the intra-day index to the underlying index.

Step 512 shows an additional step of comparing the current trading volatility of the underlying index to the historical trading volatility of the underlying index. This comparison may preferably may compare similarly windows of time for determining the current trading volatility per unit time of the underlying index and the historical trading volatility of the underlying index per unit time.

As set forth above, model(s) according to certain embodiments has been developed to handle the technology and to leverage hardware not typically associated with trading of an index fund, or options related thereto, to enable intra-day trading of an intra-day index fund.

Figure 8:
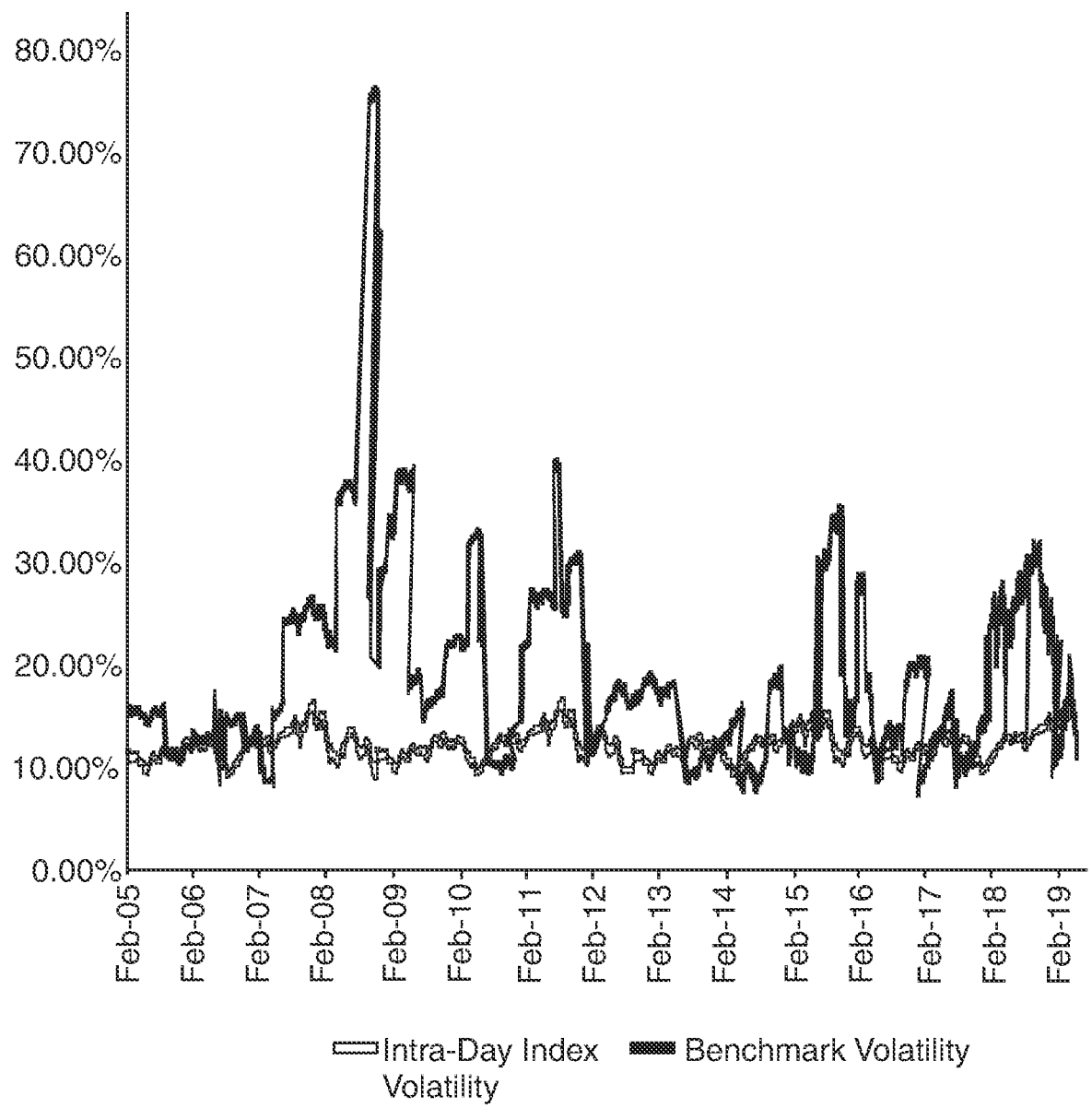
FIG. 8 shows historical volatility of the intra-day index as compared with the historical volatility of the underlying index.

A summary of such a model follows. The inter-day index can be modeled using a Monte Carlo script and the 'Local Volatility' Model (as shown in FIG. 8 below). Given this model does not properly capture forward starting volatility dynamics, two new parameters were created to adjust the model: Beta Up and Beta Down. Beta down is a factor dampening underlying daily moves (equivalent to lowering the underlying volatility) and will be used to price the monthly cap embedded in the structure. For example, a 90% beta down parameter will adjust every underlying daily move by a 0.9 factor. Beta up is a factor increasing underlying daily moves (equivalent to increasing the underlying volatility) and will be used to price the monthly uncapped performance of the structure. For example, a 110% beta up parameter may adjust every underlying daily move by a 1.1 factor.

Using the Beta up and Beta down parameters enable the system to capture additional forward starting skew, by decreasing the effective volatility used to price the monthly cap and increasing the effective volatility used to price the monthly uncapped performance. As a result, both the cap and uncapped performances are priced with a different volatility, similarly to 'Uncertain Volatility' frameworks used by other reputable dealers.

TABLE 1

Comparison of the intra-day index to the underlying index (benchmark)

| | Intra-day Index | Benchmark Index |
|---|---|---|
| Returns | 8.8% | 9.2% |
| Volatility | 13.0% | 19.4% |
| Sharpe Ratio | 0.67 | 0.47 |

From the foregoing it is shown that technology as taught herein preferably allows for better risk-adjusted returns. This risk-adjusted return is commonly-referred to as a Sharpe ratio. In the table above it is shown that the intra-day index exhibits a significantly higher Sharpe Ratio than the benchmark index (for example, the NASDAQ index) itself.

Figure 6:
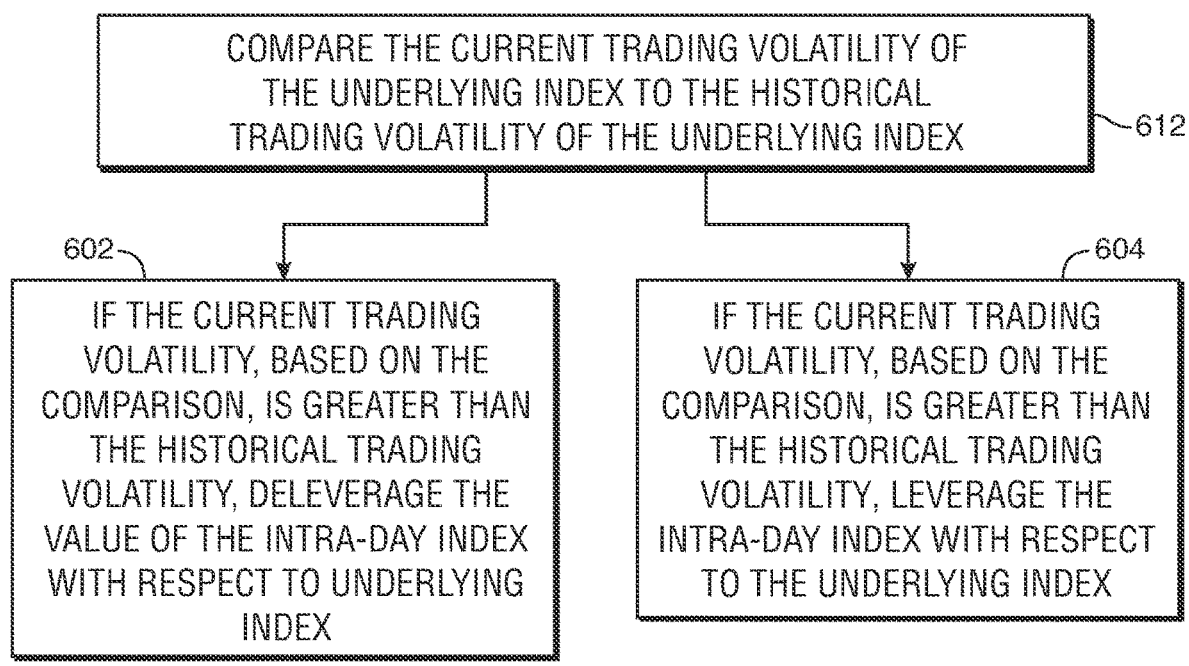
FIG. 6 shows a continuation of the illustrative flow diagram shown in FIG. 5.

FIG. 6 shows a continuation of the illustrative flow diagram shown in FIG. 5. In fact, element 612 maps directly on element 512. Step 602 shows that if the current trading volatility, based on the comparison, is greater than the historical trading volatility, then the systems and/or methods may deleverage the value of the intra-day index with respect to the underlying index.

Step 604 shows that if the current trading volatility, based on the comparison, is less than the historical trading volatility, then the systems and/or methods may increase the leverage of the value of the intra-day index relative to the underlying index.

Figure 7:
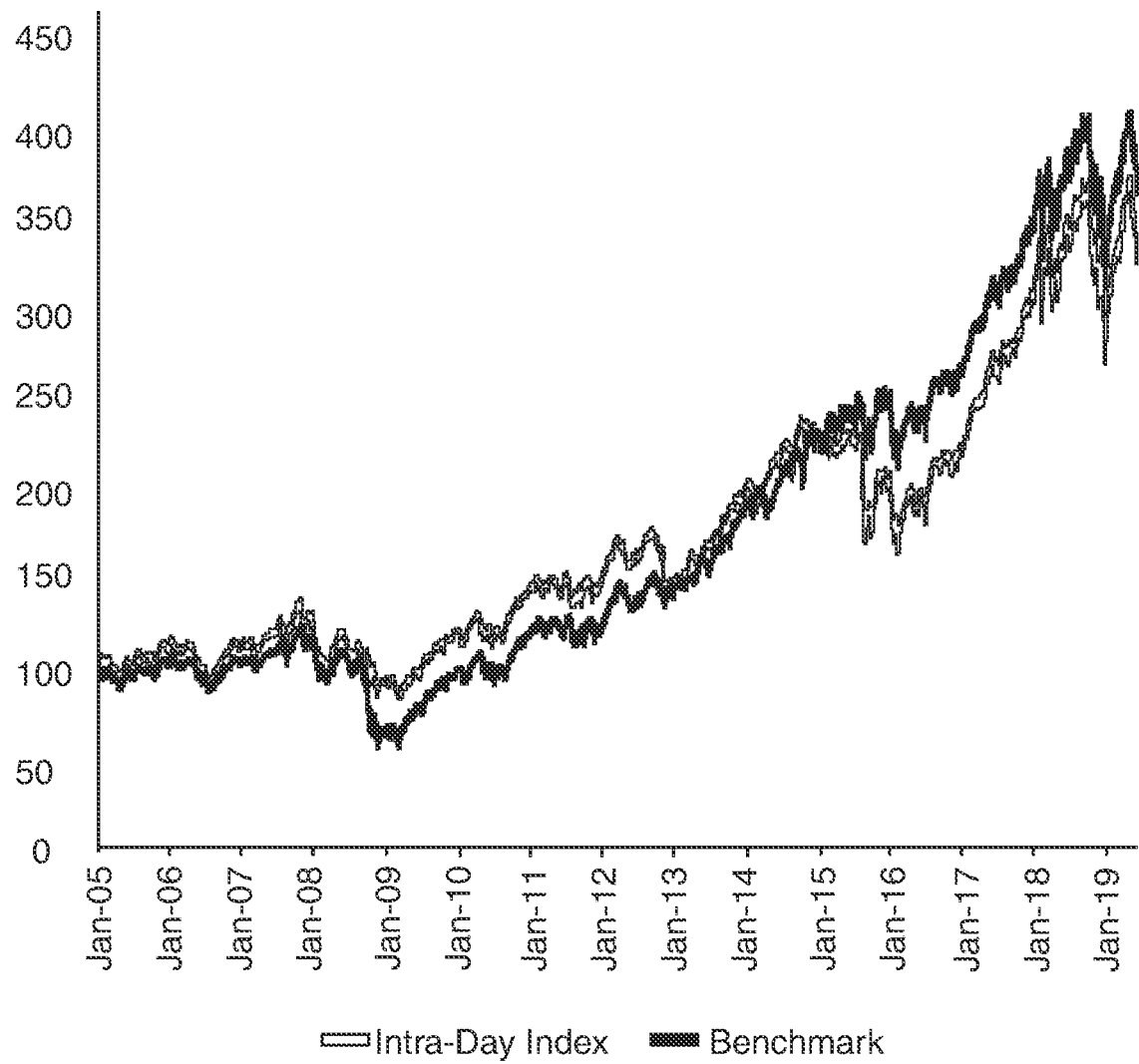
FIG. 7 shows historical values of the intra-day index as compared with the historical values of the underlying index.

FIG. 7 shows a comparison. FIG. 7 compares historical values of the intra-day index to historical values of the underlying index. The information shown in FIG. 7 preferably corresponds to the information shown in Table 1 above because Table 1 shows a close correlation between the returns of the intra-day index as compared with the historical values of the underlying index.

FIG. 8 shows a comparison. FIG. 8 compares historical volatility of the intra-day index to the historical volatility of the underlying index. The information shown in FIG. 8 preferably corresponds to the information shown in Table 1 above because Table 1 shows a substantial divergence between the historical volatility of the intra-day index as compared with the historical volatility of the underlying index.

Figure 9:
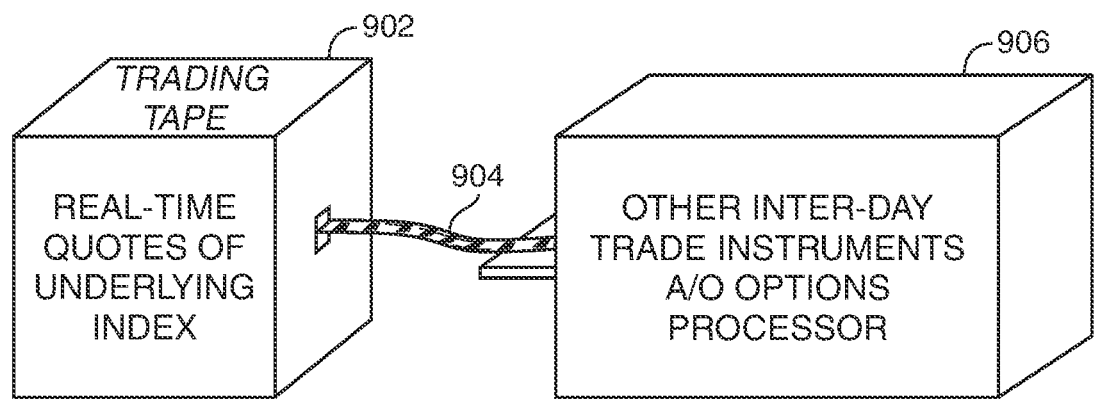
FIG. 9 shows a schematic diagram of prior art processing of an electronic flow of trading information.
Figure 9:
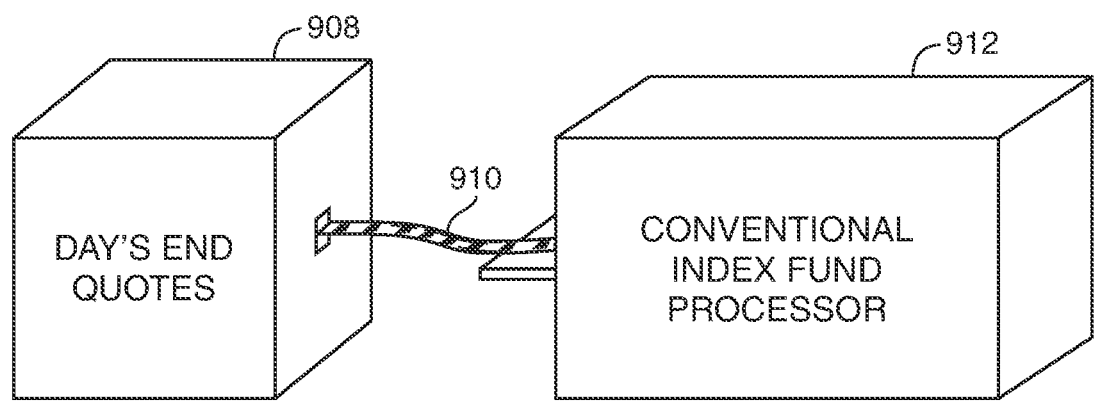

FIG. 9 shows a schematic diagram of prior art processing of an electronic flow of trading information. A trading tape, or other electronic flow of trading information is shown at 902. This information is preferably electronically transmitted at 904 to 906, which symbolizes a processor for processing other intra-day trade instruments and/or options.

At 908, FIG. 9 shows day's end quotes. These quotes are preferably electronically transmitted at 910 for processing by a conventional index fund processor.

Figure 10:
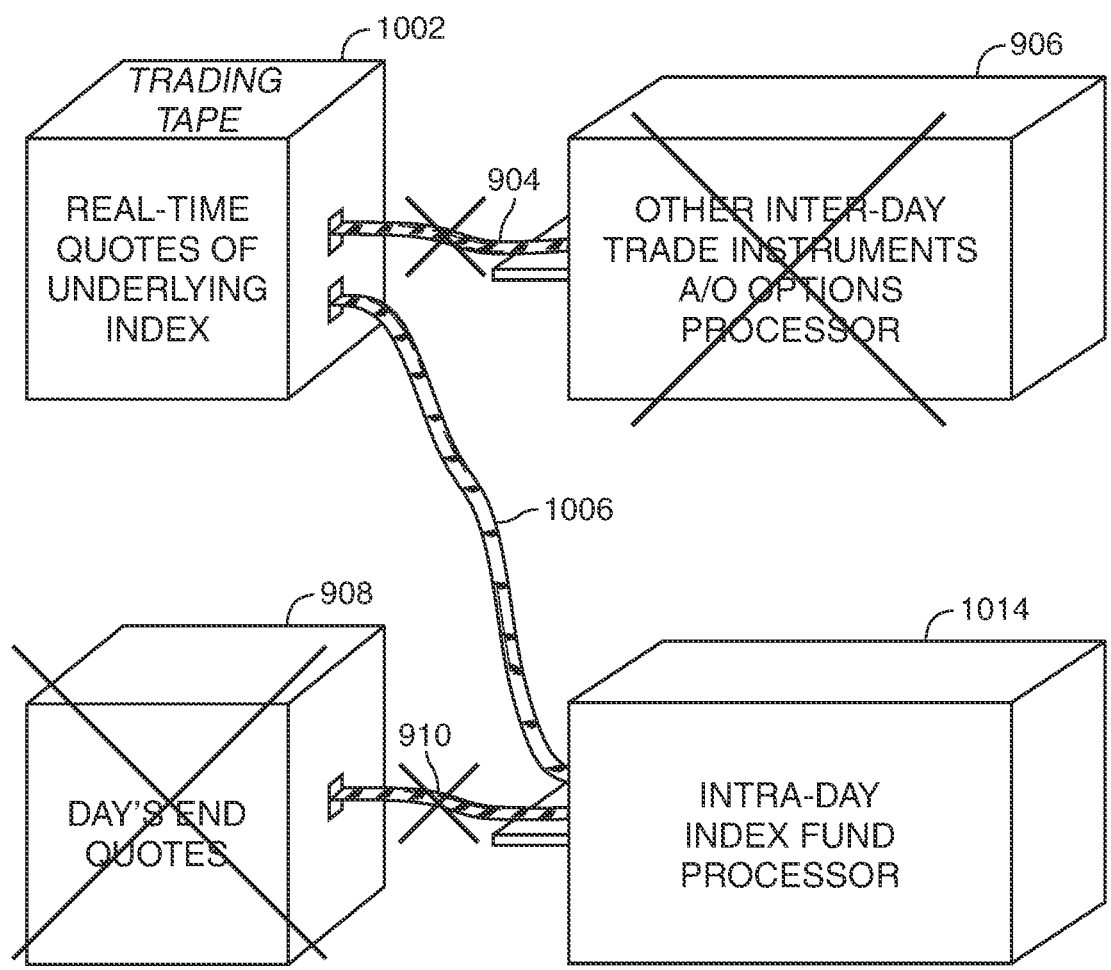
FIG. 10 shows a schematic diagram of processing of an electronic flow of trading information according to embodiments described herein.

FIG. 10 shows a schematic diagram of processing of an electronic flow of trading information according to embodiments described herein. The real-time electronic flow is shown as generated at 1002. This information may preferably be electronically transmitted at 1006 to an intra-day index fund processor 1014. Accordingly, the real-time quote generator 902 has been re-purposed for use in generating quotes suitable for use with intra-day index fund processor 1014. This preferably provides a novel architecture than can be used according to embodiments set forth herein.

From the foregoing it has been shown that systems and methods according to the embodiments preferably stabilize volatility of the intra-day index as compared to the benchmark. Such stabilization may allow for more efficient option management by reducing risk associated with hedging.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for systems and methods for providing leveraged, trading volatility responsive, intraday balancing based on projected pricing are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by an intra-day index fund processor on a computer system, perform a method for providing an hourly, intra-day rebalancing of an intra-day index, the method comprising:
   re-purposing a real-time quote generator for use in generating quotes suitable for use with the intra-day index fund processor;
   sourcing in real-time a value of an underlying index at a first, pre-determined, intra-day, balancing point, said sourcing in real-time comprising retrieving, from a local cache memory, the value from the real-time quote generator at a point in time that is fixed with respect to the balancing point;
   determining a probable value of the underlying index at a second, later-in-time, pre-determined, intra-day, balancing point, said probable value corresponding to a predicted value at the second balancing point comprising retrieving, from the local cache memory, the value from the real-time quote generator at a point in time that is fixed with respect to the second balancing point;
   if a difference between the value and the probable value is projected to increase between the first balancing point and the second balancing point, then using the intra-day index fund processor to send an instruction for proportionally increasing, by no more than a pre-determined percentage cap, an exposure of the intra-day index to a value of underlying index, via the intra-day index purchasing additional shares of the underlying index;
   if the difference between the value and the probable value is projected to decrease between the first balancing point and the second balancing point, then using the intra-day index fund processor to send an instruction for proportionally decreasing, by no more than the pre-determined percentage floor, the exposure of the intra-day index to the value of the underlying index, via the intra-day index selling shares of the underlying index;
   dividing a set of holdings of the underlying index into N sub-units, in which each of the sub-unit of holdings is traded over each of N fixed intervals respectively throughout the trading day;
   comparing using the intra-day index fund processor, the current trading volatility of the underlying index to a historic trading volatility of the underlying index;
   if the current trading volatility is greater than the historic trading volatility, then using the intra-day index fund processor to send an instruction for decreasing the leverage ("deleverage") of the intra-day index with respect to the underlying index, via the intra-day index selling shares of the underlying index;
   if the current trading volatility is less than the historic trading volatility as computed using an equally weighted moving average smoothing method, then using the intra-day index fund processor to send an instruction for increasing the leverage ("lever") of the intra-day index with respect to the underlying index, via the intra-day index purchasing additional shares of the underlying index;
   decreasing the pre-determined percentage cap in response to a finding of a decrease in trading volatility producing a more powerful effect on volatility than was previously recorded; and
   increasing the pre-determined percentage cap in response to a finding of a decrease in trading volatility producing a less powerful effect on volatility than was previously recorded,
   thereby hourly rebalancing the intra-day index.

2. The one or more non-transitory computer-readable media of claim 1 wherein the retrieving the value from the real-time quote generator at a point in time that is fixed with respect to the balancing point comprises retrieving the value from a real-time flow of electronic trades of the underlying index.

3. The one or more non-transitory computer-readable media of claim 1 wherein the pre-determined cap is the same as the pre-determined floor.

4. The one or more non-transitory computer-readable media of claim 1 wherein the pre-determined cap is different from the pre-determined floor.

5. The one or more non-transitory computer-readable media of claim 1 wherein, if the current trading volatility is greater than the historic trading volatility, the deleverage of the intra-day index with respect to the underlying index further comprises a logarithmic deleverage.

6. The one or more non-transitory computer-readable media of claim 1 wherein, if the current trading volatility is less than the historic trading volatility, the increase of the leverage of the intra-day index with respect to the underlying index further comprises a logarithmic increase in the leverage.

7. The one or more non-transitory computer-readable media of claim 1, wherein the method further comprises reducing, by a return of a risk-free investment, a calculated return of the intra-day index.

\* \* \* \* \*